United States Patent [19]

Pearlman

[11] 4,083,919
[45] Apr. 11, 1978

[54] BETA-ALUMINA COMPOSITES AND METHODS FOR PRODUCING THEM

[75] Inventor: Donald Pearlman, Rochester, N.Y.

[73] Assignee: Eastman Kodak Company, Rochester, N.Y.

[21] Appl. No.: 711,674

[22] Filed: Aug. 4, 1976

Related U.S. Application Data

[62] Division of Ser. No. 574,601, May 2, 1975, abandoned.

[51] Int. Cl.² ............................................. C04B 35/10
[52] U.S. Cl. ................................... 264/332; 106/73.4; 252/518; 423/600; 429/191; 429/193
[58] Field of Search .................. 264/61, 332; 429/191, 429/193; 423/600, 630; 106/65, 73.4; 252/518.1

[56] References Cited

U.S. PATENT DOCUMENTS

| 3,671,324 | 6/1972 | Iwai et al. ............................... 264/61 |
| 3,795,723 | 3/1974 | Clendenen et al. .................. 264/332 |

*Primary Examiner*—Donald J. Arnold
*Assistant Examiner*—John A. Parrish
*Attorney, Agent, or Firm*—Ronald P. Hilst

[57] ABSTRACT

A hot-pressed beta-alumina composition is provided which consists essentially of $M_2O \cdot nAl_2O_3$, wherein $n$ is a positive integer between about 3 and about 12 and M is selected from Na and K. The new beta-alumina composition features a flexural strength of at least about 45,000 psi as measured by ACMA Test No. 2, and high transmissability to light. Methods for preparing the above-described beta-alumina composition are also provided.

7 Claims, 3 Drawing Figures

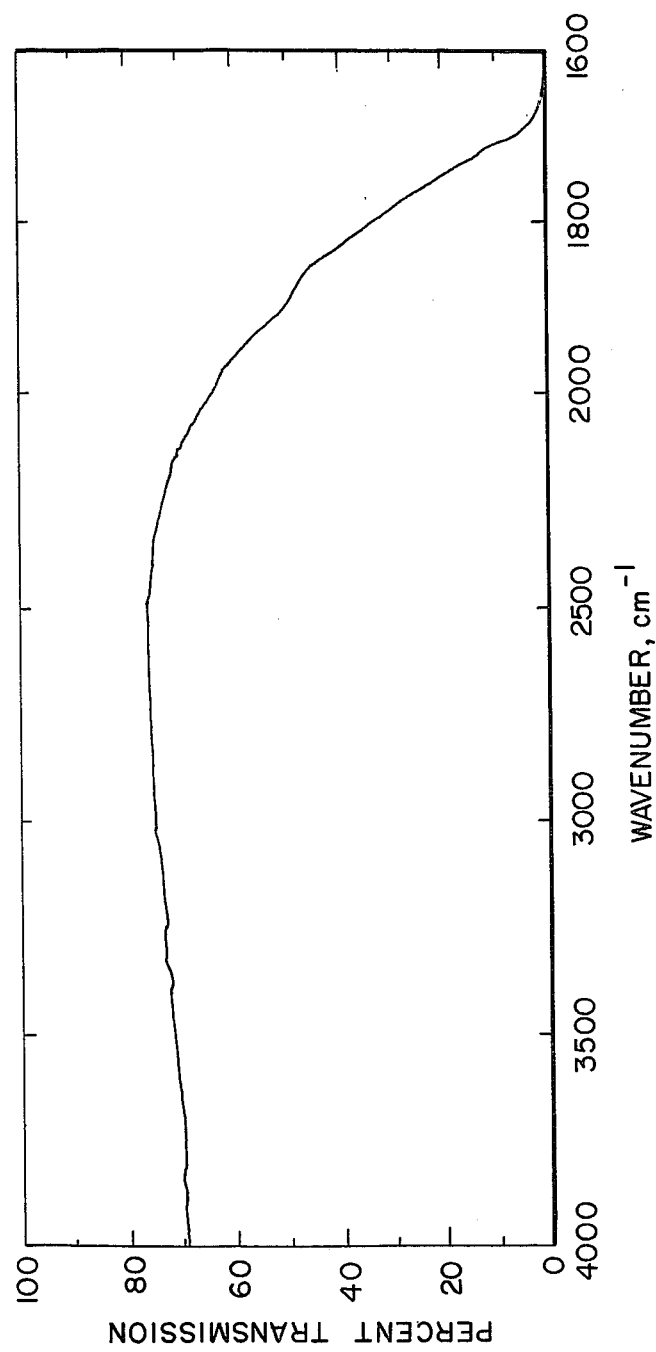

BETA-ALUMINA COMPOSITES AND METHODS FOR PRODUCING THEM

FIELD OF THE INVENTION

This invention relates to improved ionically conductive crystalline beta-alumina compositions and methods for preparing them. More specifically, the invention relates to a method for producing ionically conductive crystalline beta-alumina from a finely divided amorphous powder.

PRIOR ART

Beta-alumina is a well-known commercially available material which has found widespread use as a cation conductor in devices which are electrically or electrochemically actuated, and which is particularly useful for forming half-cell separators in batteries employing a molten alkali as a reactant. Crystalline beta-alumina has a hexagonal type structure consisting of spinel blocks of oxygen in which the aluminum is situated in the same positions as magnesium and aluminum in a magnesium aluminate spinel. The spinel blocks are separated by a NaO mirror plane. The distance between the two oxygen mirror planes distinguishes $\beta$-alumina from $\beta'$-alumina. In $\beta$-alumina, the distance between the mirror planes is 11.23 A; in $\beta''$-alumina the distance is about doubled.

Beta alumina is generally prepared commercially by heating an appropriate mixture of sodium carbonate and aluminum oxide to somewhere between 1550° and 1800° C. In U.S. Pat. No. 3,475,225, issued to G.J. Tennenhouse, typical temperatures of about 1700° C for sintering mixtures of sodium and aluminum oxides are reduced to temperatures between 1000° and 1600° C by using pressures ranging from about 5000 psi to about 110,000 psi. U.S. Pat. Nos. 3,131,238 and 3,437,724 are typical of disclosures of hot-pressing techniques for forming crystalline compositions. However, none of these are used to form beta-alumina.

The present invention results in improved crystalline beta-alumina which is produced at temperatures and pressures which are substantially lower than those employed in the prior art. In addition, the method of this invention utilizes standard equipment and readily available materials in the production of the crystalline beta-alumina which has improved physical characteristics when compared with beta-alumina produced by prior art methods.

SUMMARY OF THE INVENTION

In accordance with this invention, a hot pressed beta-alumina composition is provided which consists essentially of $M_2O \cdot nAl_2O_3$, wherein $n$ is a positive integer between about 3 and about 12 and M is an alkali metal selected from Na and K. The novel beta-alumina composition of this invention features the following physical properties; ionic conductivity, high theoretical density, and a flexural strength of at least about 45,000 psi when measured by ACMA Test No. 2. The beta-alumina compositions of this invention also have a high transmissability to light.

The ionically conductive crystalline beta-alumina composition of this invention is prepared and formed into a composite by a method which comprises:

mixing and reacting together a solution aluminum alcoholate and an aqueous solution of an alkali metal salt;

coprecipitating as a gelatinous mass aluminum hydroxide and the alkali metal salt;

drying the gelatinous mass coprecipitated in the previous step;

grinding the dried gelatinous mass into a fine amorphous powder; and hot pressing the resulting powder to yield a beta-alumina composite.

In a preferred embodiment, this invention provides a hot-pressed ionically conductive crystalline beta-alumina composition consisting essentially of $Na_2O \cdot 5Al_2O_3$. The hot pressed $Na_2O \cdot 5Al_2O_3$ beta-alumina composite has essentially theoretical density and is nearly transparent.

Beta-alumina composites produced in accordance with the teachings of this invention possess the advantage that standard hot pressing equipment can be used to attain the temperatures and pressures required, thus eliminating the need for specially designed apparatus capable of withstanding the high temperatures and pressures necessary for the methods of the prior art.

BRIEF DESCRIPTION OF THE DRAWINGS

FIG. 1 is a graph of the infrared transmission spectra of $Na_2O \cdot 5Al_2O_3$.

DETAILED DESCRIPTION OF THE INVENTION

Figure 2A:
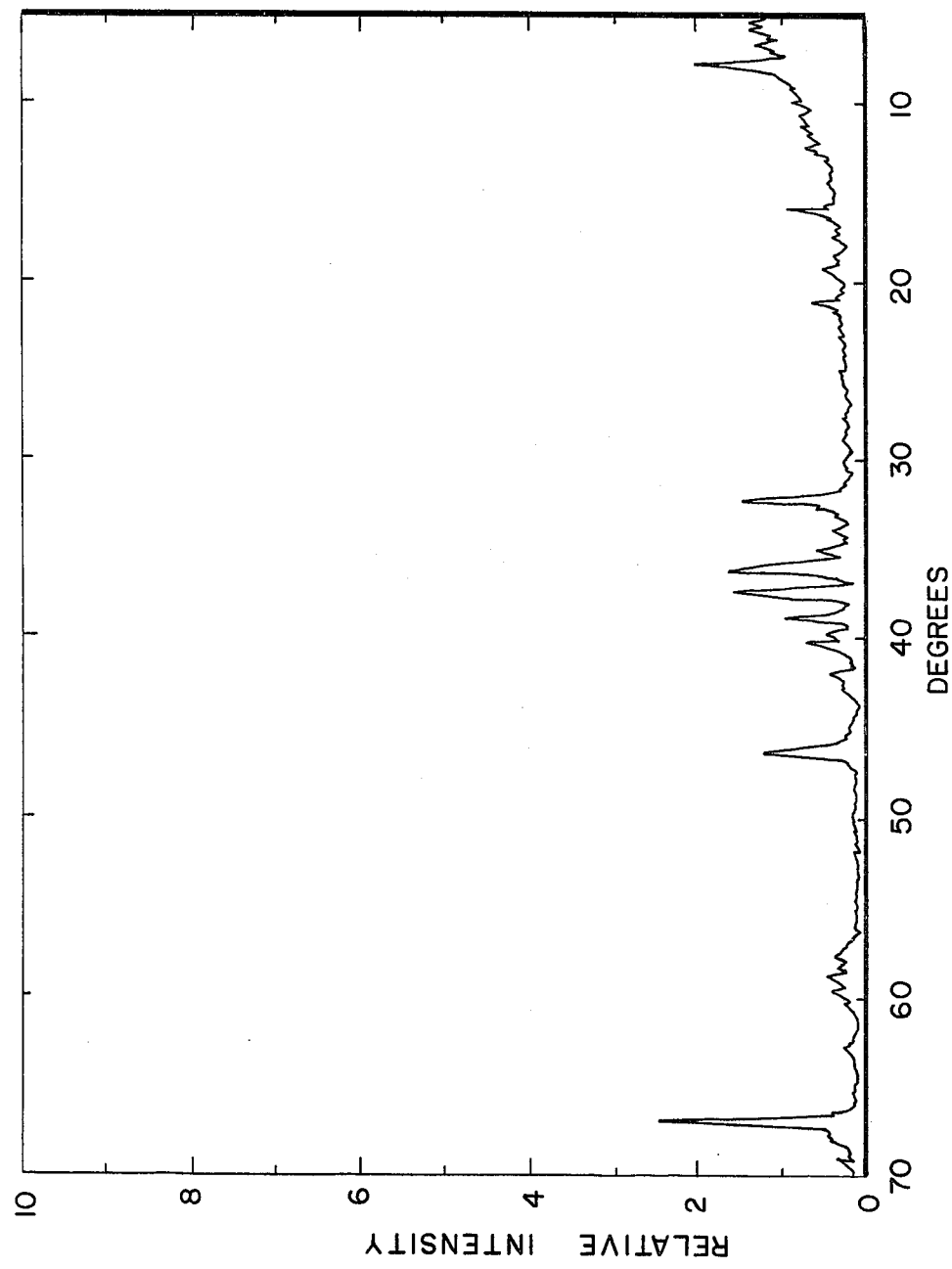
FIG. 2A is an X-ray diffraction pattern of a hot pressed composite of $Na_2O \cdot 5Al_2O_3$ taken parallel to the direction of hot pressing.

The beta-alumina composites of this invention are made by vacuum hot pressing a finely divided homogeneous beta-alumina powder. The finely divided homogeneous beta-alumina powder is prepared by first coprecipitating a mixture of hydrated aluminum oxide and an alkali metal salt from solutions of components which, when heated, give rise to a volatile by-product. To a solution of an aluminum alcoholate is added an aqueous solution of the alkali metal salt. A gelatinous precipitate of hydrated aluminum oxide and the alkali metal salt results. After separating the gelatinous precipitate from the supernatent liquid and drying it, the dried precipitate is heated at a temperature of at least about 400° C but which is less than about 1200° C, for a time period of from 1 to 16 hours, thus removing undesired volatiles. The temperature and length of time used in any particular application is dependent upon the particular alkali metal salt being used. The resulting amorphous material is then ground to a fine powder. The powder should be ground to a particle size of less than about 50 micrometers, and preferably less than 1 micrometer or submicron.

Various alkali metal salts can be used in the above-described process including, for example, the bicarbonate, acetate, hydroxide, nitrate and carbonate of sodium and potassium. The beta-alumina powders thus produced have the formula $M_2O \cdot nAl_2O_3$ wherein M is the alkali metal ion and $n$ is an integer from about 3 to about 12 depending upon the ratio of reactants used.

Before hot pressing, the powder can be placed in a pressing cylinder and cold pressed at a pressure of at least about 4000 psi and preferably in the range of from about 4000 to about 16,000 psi. This insures intimate contact between the powders and prevents vacuum removal of loose powder. Whether cold pressed or not, the powder is then placed in the pressing apparatus, and the apparatus is assembled and connected to a vacuum system. Thereafter the powder is heated to a first temperature of from about 1150° C to about 1400° C, and preferably at least about 1200° C, while a vacuum is drawn and maintained. Upon reaching the selected temperature, an initial pressure of at least about 4000 psi is applied while maintaining the vacuum. This pressure is maintained during a holding period, during which the powder can be further heated until it reaches a second temperature slightly higher than the first temperature by about 100° C. The initial pressure is held for a time period of at least about 5 minutes, preferably at least about 10 minutes. The pressure is then increased to a higher pressure of at least about 20,000 psi, advantageously at least about 25,000 psi. The compressed powder is maintained under vacuum at this temperature and pressure for a length of time of at least about 10 minutes, preferably at least about 20 minutes. Then the compressed powder is cooled to a temperature below about 1150° C and preferably to about 1000° C whereupon the vacuum is released and the pressing cylinder is backfilled with nitrogen. The compressed powder is then cooled further and the pressure is released, yielding an ionically conductive crystalline beta-alumina composite. Preferably the temperature is cooled to about 800° C before the pressure is released. It should be noted that the particular temperatures, pressures, and time periods used for the hot pressing process are generally dependent upon the composition of the powder and the amount of powder being hot pressed.

In another embodiment of the above-described process, after the compressed powder is heated to the first temperature, preferably about 1200° C, and the initial pressure is applied, the compressed powder is further heated to a higher temperature, for example 1300° C, whereupon the process is continued as described above.

The beta-alumina composites produced in accordance with the teachings of this invention exhibit spinel crystal structure as determined by X-ray diffraction patterns. Although hot pressed from an amorphous powder, all compositions produced ionically conductive crystalline composites having conductivities in the range of from about the order of $10^{-3}$ to about the order of $10^{-6}$ (ohm-cm)$^{-1}$. The beta-alumina composites of this invention further exhibited a flexural strength of at least about 45,000 psi as measured by ACMA Test No. 2 and a high transmissability to light. More specifically, the transmission of incident radiation is at least about 70% when the wavenumber of the incident radiation is between about 2200 and about 3800 cm$^{-1}$. The density of the sample is also high, approaching that of the calculated or theoretical density for a single crystal of beta-alumina having the same chemical composition. Specific examples have a density at least as high as 93% that of theoretical.

The invention will be further illustrated by the following examples.

EXAMPLE 1

In a 4 liter beaker, 408.4 g (2.0 mole) aluminum isopropoxide was dissolved in a mixture of 1750 ml of benzene and 850 ml of isopropanol. To this was added, with stirring, a solution containing 17.6 g (0.44 mole) sodium hydroxide dissolved in 500 ml water. The resulting gel was stirred for 5 minutes, allowed to stand for 1 hour, then filtered by suction and dried at 180° C for about 16 hours (overnight). The easily friable amorphous product weighed 191 g.

Thirty grams of this dried gel, contained in a fused alumina crucible, was placed in a muffle furnace at 400° C. The furnace temperature was raised to 900° C and the mixture held at 900° C for 4 hours. An amorphous beta-alumina having the composition $Na_2O \cdot 4Al_2O_3$ was produced. After cooling, the amorphous material was ground for 2 hours with a mullite mortar and pestle, using a Fisher Automatic Mortar Grinder. The material was then ready for hot pressing.

It should be noted that about 10 percent excess sodium hydroxide was used in Example 1 because it was found that, when using the hydroxide of an alkali metal, approximately 10 percent of the hydroxide does not precipitate but remains in the filtrate.

EXAMPLE 2

Beta-alumina powder prepared according to the method described in Example 1 was sieved through 270 mesh (U.S. Standard), and placed in the pressing cylinder between pyrolytic graphite discs and cold pressed at 5000 psi. The cylinder containing the powder was then placed in the pressing apparatus, and the apparatus was assembled and connected to a vacuum system.

The powder was heated to 1200° C for a time period of about 30 minutes while the vacuum was maintained below 150 microns. No pressure was applied until the powder reached 1200° C, at which time 4000 psi was applied. Heating continued until the temperature reached 1300° C. The powder was then held at 1300° C and 4000 psi for 10 minutes. The pressure was next increased to about 25,000 psi and held for 20 minutes while the temperature remained at about 1300° C. The heat was shut off and when the temperature had cooled to about 1000° C the vacuum was shut off and the apparatus backfilled with $N_2$. When the temperature was approximately 800° C the applied load was removed. The apparatus was disassembled when the temperature approached ambient, and the pressed $Na_2O \cdot 5Al_2O_3$ disc was then removed from the pressing cylinder.

EXAMPLE 3

In a manner similar to that of Example 1, beta-alumina powders were prepared using sodium bicarbonate, sodium acetate, sodium nitrate, potassium carbonate and potassium hydroxide. Except when using potassium hydroxide, the alkali metal salts were mixed in the exact proportion in which they were desired in the final product. When using potassium hydroxide, 10 percent excess hydroxide was used as in Example 1.

EXAMPLE 4

Sample $Na_2O \cdot 5Al_2O_3$ discs were prepared according to the methods described in Examples 1 and 2 except using sodium carbonate as the alkali metal salt and hot pressing at a maximum pressure of 20,000 psi. The resulting composite discs were then physically characterized.

The infrared spectra were measured using a Beckman 21A spectrophotometer. The density of the samples was determined by a hydrostatic weighing technique. The Knoop hardness was measured using a Tukon testing machine with a 400-g load. The coefficient of thermal expansion was obtained using a Leitz dilatometer on samples 10 mm long × 3 mm square. The modulus of rupture was calculated from loads measured on an Instron testing machine by the procedure described in ACMA Test No. 2. Samples 0.18 cm square × 2.54 cm long were tested using a three-point bending fixture with a 1.8 cm span. A head speed of 0.13 cm/min was used. Tests were run both parallel and perpendicular to the pressing direction. The fracture surfaces were examined using a scanning electron microscope with the sample positioned at 45°.

Figure 2B:
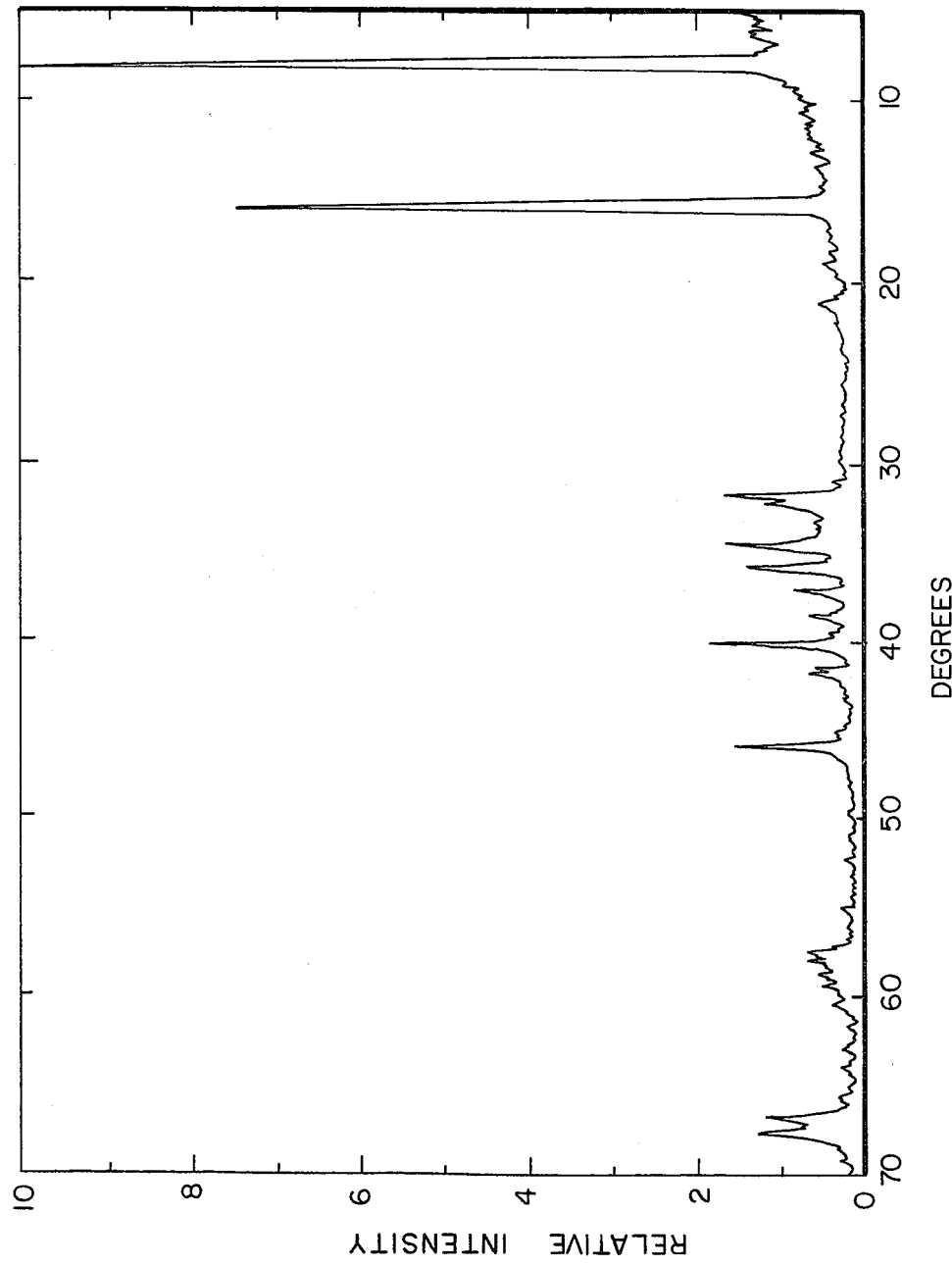
FIG. 2B is an X-ray diffraction pattern of a hot pressed composite of $Na_2O \cdot 5Al_2O_3$ taken perpendicular to the direction of hot pressing.

A typical infrared transmission spectrum is shown in FIG. 1, for a thickness of 1.5 mm. As can be seen, the sample is free of impurity absorption bands frequently found in single crystals that have been exposed to moist air. Note particularly the absence of D(OH) absorption at 3100 cm$^{-1}$. X-ray diffraction analysis was made both parallel and perpendicular to the direction of hot pressing. FIG. 2A shows a typical X-ray diffraction pattern parallel to the direction of hot pressing and FIG. 2B shows a typical X-ray diffraction pattern perpendicular to the direction of hot pressing. Enhancement of the refraction peaks as seen in FIG. 2B indicate a preferred crystalline orientation.

Other physical properties of the samples are tabulated below in Tables 1 and 2.

Table 1

Properties of $Na_2O \cdot 5Al_2O_3$

| | | |
|---|---|---|
| Knoop hardness | 1120-1200 | 400-g load |
| Coeff. of expansion | 7.03 × 10$^{-6}$ in./in./° C | 25–800° C |
| Density | 3.257 g/cc | |
| Ionic conductivity | 7.5 × 10$^{-4}$ (ohm cm) | at 25° C (parallel face) |

Table 2

| Modulus of Rupture (Flexural Strength) | |
|---|---|
| Load applied to surface parallel in direction of pressing | Load applied to surface perpendicular in direction of pressing |
| Sample No. | Sample No. |
| 1    53,636 psi | 2    58.252 psi |
| 4    46,120 | 3    58,463 |
| 5    46,120 | 9    56,820 |
| 6    52,075 | |

After the pressed discs of $Na_2O \cdot 5Al_2O_3$ were ground and polished, they were highly translucent to visible light. In fact, they were nearly transparent in that overhead lights could clearly be seen through them.

EXAMPLE 5

$Na_2O \cdot nAl_2O_3$ powders wherein n=4, 6 and 11 were produced in a manner similar to to Example 1 except that after drying, samples were heated at 400°, 900° and 1200° C for various lengths of time before grinding and hot pressing. All powders made by heating at 400° or 900° C were amorphous. The hot-pressing steps of Example 2 were followed to make composites for measuring physical properties, except that the temperature was not increased above 1200° C during the application of pressure. The results are tabulated below in Tables 3, 4 and 5.

Table 3

$Na_2O : 4Al_2O_3$

| Time Hrs. | Temp. °C | σ, (ohm-cm)$^{-1}$ Dry | Wet | % Theor. Dens. | Al/Na | BET M$^2$/g | Particle Size μm |
|---|---|---|---|---|---|---|---|
| 1 | 400 | 1.7 × 10$^{-4}$ | 3.4 × 10$^{-4}$ | 98.3 | 3.90 | 62 | 0.03 |
| 3 | " | 1.9 × 1$^{-4}$ | 3.2 × 10$^{-4}$ | 98.4 | 4.06 | 86 | 0.02 |
| 8 | " | 3.5 × 10$^{-4}$ | 2.8 × 10$^{-4}$ | 97.6 | 4.13 | 83 | 0.02 |
| 16 | " | 1.4 × 10$^{-4}$ | 3.1 × 10$^{-4}$ | 98.1 | 4.26 | 73 | 0.03 |
| 1 | 900 | 1.6 × 10$^{-4}$ | 3.1 × $-4$ | 98.2 | 4.12 | 41 | 0.05 |
| 3 | " | 3.1 × 10$^{-4}$ | 2.4 × 10$^{-4}$ | 98.7 | 4.06 | 39 | 0.05 |
| 8 | " | 2.1 × 10$^{-4}$ | 2.3 × 10$^{-4}$ | 98.2 | 4.16 | 30 | 0.06 |
| 16 | " | 1.9 × 10$^{-4}$ | 2.2 × 10$^{-4}$ | 97.3 | 4.11 | 23 | 0.08 |
| 1 | 1200 | 1.7 × 10$^{-4}$ | 1.7 × 10$^{-4}$ | 95.7 | 4.23 | 3 | 0.62 |
| 3 | " | 1.1 × 10$^{-4}$ | 2.7 × 10$^{-4}$ | 96.9 | 4.30 | 4 | 0.46 |
| 8 | " | 1.4 × 10$^{-4}$ | 2.9 × 10$^{-4}$ | 96.9 | 3.80 | 7 | 0.26 |
| 16 | " | 8 × 10$^{-5}$ | 2 × 10$^{-4}$ | — | 4.31 | 10 | 0.19 |

Table 4

$Na_2O:6Al_2O_3$

| Time Hrs | Temp °C | σ, (ohm-cm)$^{-1}$ Dry | Wet | % Theor. Dens. | Al/Na | BET Size M$^2$/g | Particle μm |
|---|---|---|---|---|---|---|---|
| 1 | 400 | 1.6 × 10$^{-4}$ | 3.0 × 10$^{-4}$ | 97.3 | 5.67 | 95 | 0.02 |
| 3 | " | 1.7 × 10$^{-4}$ | 3.7 × 10$^{-4}$ | 98.2 | 5.58 | 93 | 0.02 |
| 8 | " | 2.7 × 10$^{-4}$ | 3.17 × 10$^{-4}$ | 97.8 | 5.46 | 96 | 0.02 |
| 16 | " | 2.3 × 10$^{-4}$ | 3.2 × 10$^{-4}$ | 97.2 | 5.77 | 110 | 0.02 |
| 1 | 900 | 2 × 10$^{-4}$ | 3.1 × 10$^{-4}$ | 97.8 | 5.78 | 62 | 0.03 |
| 3 | " | 1.7 × 10$^{-4}$ | 1.9 × 10$^{-4}$ | 98.9 | 5.77 | 49 | 0.04 |
| 8 | " | 1.5 × 10$^{-4}$ | 8.6 × 10$^{-5}$ | 96.2 | 5.90 | 51 | 0.04 |
| 16 | " | 1.9 × 10$^{-4}$ | 1 × 10$^{-4}$ | 95.6 | 5.81 | 45 | 0.04 |
| 1 | 1200 | 5.9 × 10$^{-5}$ | 1.7 × 10$^{-4}$ | 95.4 | 5.76 | 6 | 0.31 |
| 3 | " | 1.1 × 10$^{-5}$ | 2.7 × 10$^{-4}$ | 97.0 | 5.95 | 7 | 0.26 |
| 8 | " | 1.5 × 10$^{-4}$ | 2.2 × 10$^{-4}$ | 96.4 | 5.60 | 6 | 0.31 |
| 16 | " | 8.8 × 10$^{-5}$ | 1.4 × 10$^{-4}$ | 95.2 | 6.41 | 6 | 0.31 |

Table 5

$Na_2O:11Al_2O_3$

| Time Hrs. | Temp °C | $\sigma$, (ohm-cm)$^{-1}$ Dry | $\sigma$, (ohm-cm)$^{-1}$ Wet | Dens. | Al/Na | BET M$^2$/g | Particle size μm |
|---|---|---|---|---|---|---|---|
| 1 | 400 | $2.7 \times 10^{-4}$ | $1.51 \times 10^{3\ 15}$ | 96.9 | 10.25 | 167 | 0.01 |
| 3 | " | $1.5 \times 10^{-5}$ | $1.6 \times 10^{-5}$ | 96.2 | 10.20 | 175 | 0.01 |
| 8 | " | $3.8 \times 10^{-5}$ | $1.2 \times 10^{-5}$ | 97.4 | 11.17 | 167 | 0.01 |
| 16 | " | $6.7 \times 10^{-5}$ | $5.3 \times 10^{-5}$ | 93.0 | 10.89 | 173 | 0.01 |
| 1 | 900 | $1.0 \times 10^{-5}$ | $3.1 \times 10^{-5}$ | 98.4 | 11.48 | 116 | 0.02 |
| 3 | " | $8.3 \times 10^{-6}$ | $1 \times 10^{-5}$ | 97.4 | 10.79 | 106 | 0.02 |
| 8 | " | $8.9 \times 10^{-5}$ | $1.1 \times 10^{-5}$ | 96.2 | 10.72 | 87 | 0.02 |
| 16 | " | $8.5 \times 10^{-6}$ | $1.2 \times 10^{-5}$ | 96.6 | 10.84 | 91 | 0.02 |
| 1 | 1200 | $7.4 \times 10^{-6}$ | $3.5 \times 10^{-5}$ | 97.6 | 10.93 | 24 | 0.08 |
| 3 | " | $6.1 \times 10^{-6}$ | $2.9 \times 10^{-6}$ | 93.0 | 11.80 | 8 | 0.23 |
| 8 | " | $9 \times 10^{-6}$ | $2 \times 10^{-6}$ | 92.8 | 10.68 | 9 | 0.20 |
| 16 | " | $1.3 \times 10^{-5}$ | $1.2 \times 10^{-5}$ | 94.7 | 11.46 | 8 | 0.23 |

EXAMPLE 6

$Na_2O \cdot nAl_2O_3$ powders wherein $n$ was varied from 3 to 12 were produced in a manner similar to that of Example 1. After hot pressing at 1200° C, the conductivity of the resulting beta-alumina composite was measured and its X-ray diffraction pattern was examined. The results are tabulated below in Table 6.

Table 6

| $Na_2O:Al_2O_3$ | $Na_2O \cdot Al_2O_3$ Hot-Pressed at 1200° C (Dry) (ohm-cm)$^{-1}$ | X-ray diffraction $\alpha$ | X-ray diffraction $\beta$ |
|---|---|---|---|
| 1:3 | $1.6 \times 10^{-4}$ | | X |
| 1:4 | $1.7 \times 10^{-4}$ | | X |
| 1:5 | $5 \times 10^{-4}$ | | X |
| 1:6 | $5 \times 10^{-4}$ | | X |
| 1:7 | $3.2 \times 10^{-5}$ | X | X |
| 1:8 | $1.6 \times 10^{-5}$ | X | X |
| 1:9 | $1.6 \times 10^{-5}$ | X | X |
| 1:10 | $6 \times 10^{-5}$ | X | X |
| 1:11 | $1 \times 10^{-5}$ | X | X |
| 1:12 | $2.8 \times 10^{-5}$ | X | X |

This invention has been fully disclosed with particular references to the preferred embodiments thereof. However, it is understood that variations and modifications can be made without departing from the spirit and scope of this invention.

We claim:

1. A method for making a hot pressed beta-alumina composite which comprises:
   mixing and reacting together a solution of aluminum alcoholate and an aqueous solution of an alkali metal salt;
   coprecipitating as a gelatinous mass aluminum hydroxide and the alkali metal salt;
   drying the gelatinous mass coprecipitated in the previous step;
   heating the dried mass to a temperature between about 400° C to about 1200° C;
   cooling and grinding the dried gelatinous mass into a fine amorphous powder; and
   hot pressing the resulting powder to yield a beta-alumina composite.

2. The method as defined in claim 1 wherein the hot pressing step includes the steps of:
   loading the powder into a pressing cylinder;
   and while maintaining the pressing cylinder under a vacuum,
   (1) gradually heating the powder to a first temperature;
   (2) applying an initial pressure to compress the powder after attaining the first temperature;
   (3) maintaining the compressed powder at at least the attained temperature and at the initial pressure for a first predetermined time period;
   (4) increasing the pressure to a holding pressure which is higher than the initial pressure;
   (5) holding the compressed powder at the attained values for a second predetermined time period;
   (6) cooling the compressed powder to a temperature which is lower than the first temperature whereupon the vacuum is released;
   (7) backfilling the pressing cylinder with an inert gas; and
   (8) cooling the compressed powder further to a temperature lower than that achieved by step (6), and thereafter removing the pressure.

3. The method of claim 2 wherein after the loading step, the powder is cold pressed under a pressure of at least 4000 psi.

4. The method of claim 2 wherein the first temperature is at least 1200° C and wherein, after applying the initial pressure on the compresssed powder, the method further comprises the step of heating the compressed powder to attain a higher temperature which is at least 100° C higher than said first temperature.

5. The method of claim 2 wherein the first predetermined time period is at least 5 minutes and the second predetermined time period is at least 10 minutes.

6. The method of claim 1 wherein said alkali metal salt is selected from the group consisting of bicarbonate, acetate, hydroxide, nitrate and carbonate of sodium or potassium.

7. A method for making a hot pressed beta-alumina composite which comprises:

mixing and reacting together a solution of aluminum alcoholate and an aqueous solution of an alkali metal salt;

coprecipitating as a gelatinous mass aluminum hydroxide and the alkali metal salt;

drying the gelatinous mass coprecipitated in the previous step;

heating the dried mass to a temperature between about 400° C to about 1200° C;

cooling and grinding the dried gelatinous mass into a fine amorphous powder; and hot pressing the resulting powder to yield a beta-alumina composite, wherein the hot pressing step includes the steps of:

loading the powder into a pressing cylinder;

cold pressing the powder by applying a pressure of at least 4000 psi;

maintaining the pressure cylinder under a vacuum;

gradually heating the powder to a first temperature of at least 1200° C;

applying an initial pressure of at least 4000 psi to compress the powder after attaining the first temperature;

maintaining the compressed powder at at least the first temperature and at the initial pressure for at least 10 minutes;

increasing the pressure to a holding pressure of at least 20,000 psi;

holding the compressed powder at at least the first temperature and the holding pressure for at least 20 minutes;

cooling the compressed powder to about 1000° C whereupon the vacuum is released;

backfilling the pressing cylinder with an inert gas; and cooling the compressed powder further to about 800° C whereupon the pressure is removed.

* * * * *